United States Patent [19]

VanRens

[11] Patent Number: 5,011,398

[45] Date of Patent: Apr. 30, 1991

[54] APPARATUS FOR LOST FOAM MOLDING AND METHOD OF ASSEMBLING SAME

[75] Inventor: Russell J. VanRens, Milwaukee, Wis.

[73] Assignee: Outboard Marine Corporation, Waukegan, Ill.

[21] Appl. No.: 561,290

[22] Filed: Jul. 26, 1990

Related U.S. Application Data

[63] Continuation of Ser. No. 337,754, Apr. 13, 1989, abandoned.

[51] Int. Cl.$^5$ .................. B29C 33/30; B29C 33/44
[52] U.S. Cl. ........................... 425/444; 29/464; 29/467; 249/67; 264/219; 425/4 R; 425/817 R
[58] Field of Search .............. 425/4 R, 182, 351, 444, 425/422, 556, 817 R; 264/219; 29/464, 467; 249/67, 68; 164/347

[56] References Cited

U.S. PATENT DOCUMENTS

| | | | |
|---|---|---|---|
| 3,257,720 | 6/1966 | Siler | 29/464 |
| 3,433,450 | 3/1969 | Brunner et al. | 425/444 X |
| 3,986,805 | 10/1976 | Haines | 425/444 X |
| 4,050,666 | 9/1977 | Van Tichelt | 249/68 |
| 4,341,008 | 7/1982 | Graboyes et al. | 29/467 |
| 4,558,504 | 12/1985 | Le Pargneux et al. | 29/452 |
| 4,628,574 | 12/1986 | Lerman | 29/467 X |
| 4,645,446 | 2/1987 | Hehl | 425/444 X |
| 4,661,055 | 4/1987 | Thivichon-Prince et al. | 425/444 X |
| 4,891,002 | 1/1990 | Inaba et al. | 249/67 X |

FOREIGN PATENT DOCUMENTS 2144451 3/1973 Fed. Rep. of Germany ...... 425/444

Primary Examiner—Richard L. Chiesa
Attorney, Agent, or Firm—Michael, Best & Friedrich

[57] ABSTRACT

A device for aiding in the assembly of a mold apparatus of the type including a mold cavity having a first side which is contoured to impart a shape to a component, a second side, and an aperture extending between the first and second sides, and of the type including an ejector pin positioned adjacent the second side, the ejector pin having an end positioned to move into the aperture to become a portion of a surface including the first side when the mold assembly is assembled, and positioned to effect movement of the component away from the mold cavity after the component is imparted with the shape, the device including an assembly pin having an end positioned to pass through the aperture, and a sleeve having a first portion positioned to slide onto the end of one of the ejector pins and to support itself on the end of the ejector pin and having a second portion protruding from the end of the ejector pin to receive therein the end of the assembly pin in axial alignment with the ejector pin in the sleeve.

15 Claims, 1 Drawing Sheet

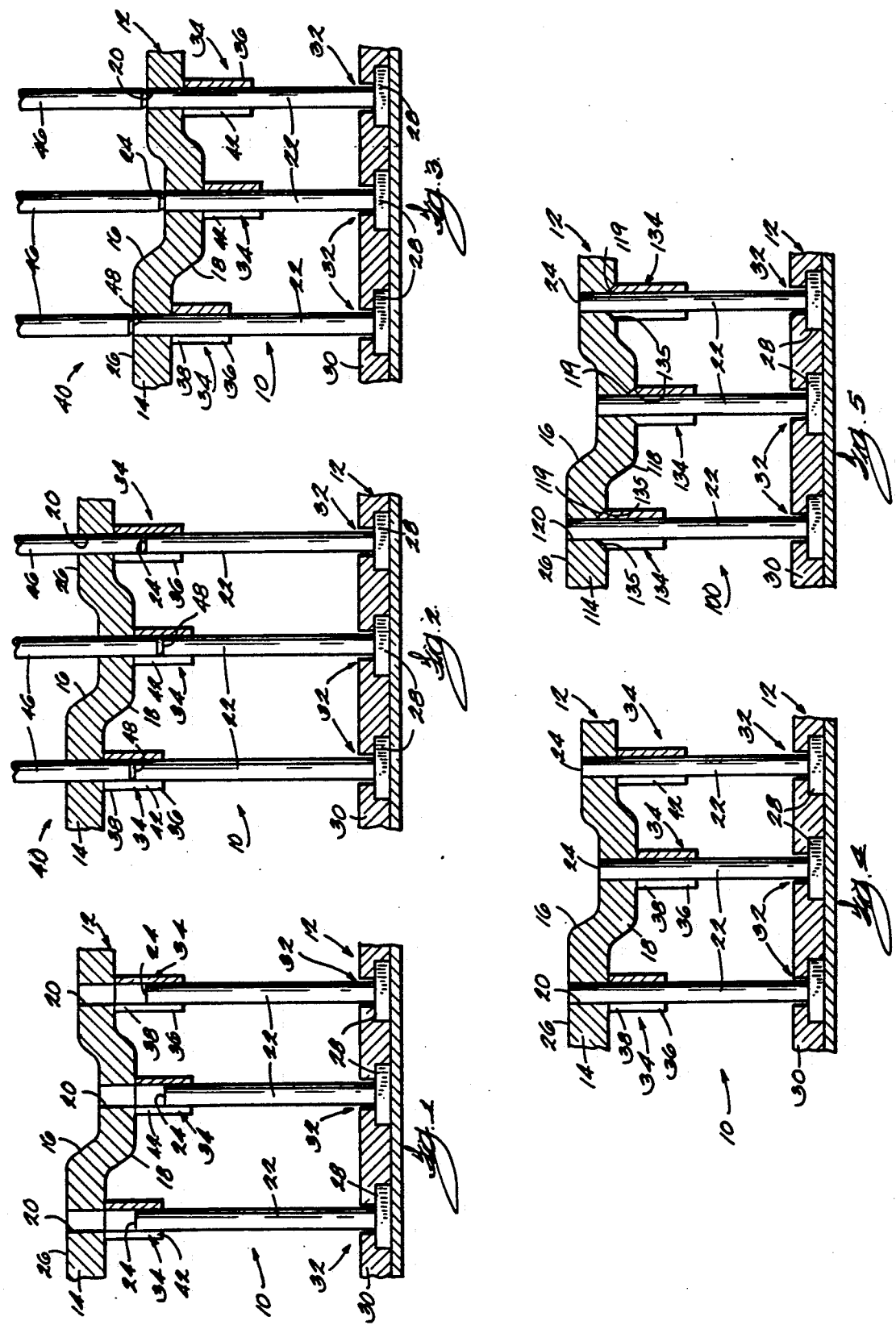

APPARATUS FOR LOST FOAM MOLDING AND METHOD OF ASSEMBLING SAME

BACKGROUND OF THE INVENTION

This application is a continuation of application Ser. No. 337,754 filed Apr. 13, 1989, now abandoned.

The invention relates generally to molding apparatus and, more particularly, to apparatus used in lost foam molding.

Prior art molding apparatus used in lost foam molding generally comprise a mold having a first side which is contoured to impart a shape to a component, a second side opposite the first side, a plurality of apertures extending between the first and second sides, and a plurality of ejector pins adapted to be positioned at the second side of the mold cavity member. Each ejector pin typically has a first end adapted to move into one of the apertures to become a portion of a surface including the first side of the mold when the mold apparatus is assembled, and a second end. The prior art molding apparatus also include an ejector plate which extends transversely to the ejector pins, and which is attached to the second ends of the ejector pins.

In assembling prior art mold apparatus, the mold is typically moved toward the ejector pins until the second side of the mold makes contact with an ejector pin. The mold is then moved until the ejector pin enters into the aperture intended for it. Then, the mold is again moved in the general direction of the ejector pins until the second side of the mold makes contact with a second one of the ejector pins, and the position of the mold is again adjusted until the second ejector pin enters into the aperture intended for it. This process is repeated until all of the ejector pins are inserted into their intended apertures. The mold is then moved toward the ejector plate until the first ends of the ejector pins become part of the surface that includes the first side of the mold. The position of the mold is then fixed relative to the ejector plate before a molding operation. After a molding operation, the ejector plate is moved toward the component, and the ejector pins eject the component from the mold. The ejector plate then retracts the ejector pins, and limits their travel so that the first ends of the ejector pins again become part of the surface including the first side.

A problem associated with prior art mold apparatus is that during assembly of the apparatus, when the ejector pins are inserted into the apertures through the mold, the first ends of the ejector pins remove material from the second side of the mold while the apertures are aligned with the ejector pins. This is due, at least in part, to the fact that the first ends of the ejector pins are adapted to form a portion of the surface including the first side of the mold, and thus have sharp edges.

Attention is directed toward the following U.S. patent references, each of which relates generally to shafts movable in sleeves: Graboyes et al. U.S. Pat. No. 4,341,008, July 27, 1982 Le Pargneux et al. U.S. Pat. No. 4,558,504, Dec. 17, 1985.

SUMMARY OF THE INVENTION

The invention provides a mold assembly comprising a mold apparatus including a mold member having a first side which is contoured to impart a shape to a component, a second side opposite the first side, and an aperture extending between the first and second sides, an ejector pin adapted to be positioned proximate the second side of the mold member, the ejector pin having a first end adapted to move into one of the apertures to become a portion of a surface including the first side when the mold assembly is assembled, the ejector pin being adapted, after the mold assembly is assembled, to effect movement of the component away from the mold member after the component is imparted with the shape, the mold assembly further comprising means for reducing destructive contact of the first end of the ejector pin with the second side of the mold member when the and moves into the aperture during assembly of the mold assembly.

One aspect of the invention provides a device for aiding in the assembly of a mold apparatus of the type including a mold cavity having a first side which is contoured to impart a shape to a component, a second side, and an aperture extending between the first and second sides, and of the type including an ejector pin positioned adjacent the second side, the ejector pin having an end adapted to move into the aperture to become a portion of a surface including the first side when the mold assembly is assembled, and adapted to effect movement of the component away from the mold cavity after the component is imparted with the shape, the device comprising an assembly pin having an end adapted to pass through the aperture, and a sleeve having a first portion adapted to slide onto the end of one of the ejector pins and to support itself on the end of the ejector pin and having a second portion protruding from the end of the ejector pin to receive therein the end of the assembly pin in axial alignment with the ejector pin in the sleeve.

Another aspect of the invention provides a method of assembling a mold apparatus of the type including a mold member having a first side which is contoured to impart a shape to a component, a second side opposite the first side, and a plurality of apertures extending between the first and second sides, and of the type including a like plurality of ejector pins generally positioned adjacent the second side and having respective ends adapted to respectively move into the apertures and to become a portion of a surface including the first side when the mold assembly is assembled, and also adapted to effect movement of the component away from the mold cavity, the method comprising the steps of providing a like plurality of assembly pins having respective ends adapted to respectively pass through the apertures, and providing a like plurality of sleeves respectively adapted to slide partially onto the ends of the ejector pins and to effect self support thereof on the respective ends of the ejector pins and with respective portions of the sleeves exposed to receive therein the respective ends of the assembly pins in axial alignment with the respective ejector pins in the sleeves, partially and respectively sliding the sleeves onto the ends of the ejector pins, positioning the second side of the mold member proximate to the sleeves, respectively inserting the assembly pin ends through the apertures from the first side of the mold member and into the exposed portions of the sleeves, and moving the mold member relative to the ejector pins so that the ejector pins move into the apertures.

DESCRIPTION OF THE VIEWS OF THE DRAWINGS

FIGS. 1 through 4 are fragmentary side elevational views, partially in section, of a mold assembly which embodies various of the features of the invention.

FIG. 5 is a fragmentary side elevational view, partially in section, of an alternate mold assembly which embodies various of the features of the invention.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

DESCRIPTION OF THE PREFERRED EMBODIMENTS

Shown in FIGS. 1-4 is a mold assembly 10 which can be used, for example, for lost foam molding.

The mold assembly 10 comprises a mold apparatus 12 including a mold member 14 having a first side 16 which is contoured to impart a shape to a component (not shown), a second side 18 opposite the first side 16, and a plurality of apertures 20 extending between the first and second sides, 16 and 18, respectively.

The mold apparatus 12 further includes a like plurality of ejector pins 22 which are adapted to be positioned proximate the second side 18 of the mold member 14. The ejector pins 22 have respective ends 24 adapted to move respectively into the apertures 20 to become, when the mold assembly 10 is assembled (see FIG. 4), a portion of a surface 26 that includes the first side 16 of the mold member 14. The plurality of ejector pins 22 are adapted, after the mold assembly 10 is assembled (FIG. 4 shows the mold assembly 10 in an assembled state, and prepared for a molding operation), to effect movement of the component away from the mold member after a molding operation occurs. The ejector pins 22 further have respective second ends 28 opposite to the ends 24.

The mold assembly 10 further includes an ejector plate 30 extending generally transversely to the ejector pins 22, and fixed to the second ends 28 of the ejector pins. In the figures, the ejector plate is shown as including slots 32 which engage the second ends of the ejector pins 22, which second ends are shown having the general shape of a head of a nail. The ejector plate 30 is adapted to move the ejector pins 22 in a first direction toward the component to eject the component after a molding operation, and to then move the ejector pins 22 in a second direction opposite the first direction so that, after the component is ejected, the first ends 24 again become a portion of the surface 26 including the first side. Travel of the ejector plate 30 in the direction away from the mold member 14, after the mold assembly 10 is assembled, is limited so that the first ends 24 become the portion of the surface 26, and so that the ejector pins 22 are not allowed to become withdrawn from the apertures 20.

The mold assembly 10 further includes means for reducing destructive contact of the first end 24 of one of the ejector pins 22 with the second side 18 of the mold member 14 when the end 24 moves into one of the apertures 20 during assembly of the mold assembly 10.

While various constructions can be employed, in FIGS. 1-4 the means for reducing destructive contact comprises a sleeve 34 having a first portion 36 adapted to slide onto the end 24 of the ejector pin 22, and having a second portion 38 for a purpose that will later be described. Preferably, the sleeve 34 has a generally cylindrical interior surface. Optionally, but preferably, the sleeve 34 includes an axially extending slit 42, and an inner diameter that is slightly less than the outer diameter of the ejector pin 22 so that the sleeve 34 can support itself on the ejector pin 22.

FIG. 5 shows an alternate mold assembly 100 that is substantially similar to the mold assembly 10 except that it includes a mold member 114 having a second side 118 that has a chamfer 119 at an aperture 120, and that it has a sleeve 134 that includes a taper 135 for engagement with the chamfer 119 to facilitate alignment of the sleeve 134 with the aperture 120.

A device 40 for aiding in the assembly of the mold apparatus 12 is shown in FIGS. 2 and 3. The device 40 includes means for reducing destructive contact of the first end 24 of one of the ejector pins 22 with the second side 18 of the mold member 14 when the end 24 moves into one of the apertures 20 during assembly of the mold assembly 10. While various constructions can be employed, in FIGS. 2 and 3, the means included in the device 40 for reducing destructive contact comprises the sleeve 34.

The device 40 further comprises an assembly pin 46 having an end 48 adapted to pass through one of the apertures 20. Optionally, but preferably, the end 48 of the assembly pin 46 is tapered to facilitate insertion of the end 48 into one of the apertures 20 and into the sleeve 34. FIG. 2 shows a plurality of assembly pins 46 as having their ends 48 respectively inserted through the apertures 20 and into sleeves 34 in axial alignment with ejector pins 22 in the sleeves 34.

Referring now to FIGS. 1-4, a method of assembling the mold apparatus 12 will be described. First, a like plurality of the assembly pins 46 and the sleeves 34 are provided. Next, the sleeves 34 are partially and respectively slid onto the ends of the ejector pins 22. Subsequently, the second side 18 of the mold member 14 is positioned proximate to the sleeves 34 (see FIG. 1). The ends 48 of the assembly pins 46 are then respectively inserted through the apertures 20 from the first side 16 of the mold member 14 and into the exposed portions 38 of the sleeves 34, to the position shown in FIG. 2. Next, the mold member 14 is moved relative to the ejector pines 22 so that the ejector pins 22 move into the apertures 20 (see FIG. 3). The mold assembly can then be prepared for a molding operation in a standard fashion, for example, the position of the mold member 14 can be fixed relative to the normal pre-ejection location of the ejector plate 30.

In a preferred embodiment of the invention, the step of inserting the assembly pin ends 48 through the apertures 20 and into exposed portions 38 of the sleeves 34 comprises the steps of first inserting one of the assembly pin ends 48 through one of the apertures 20 from the first side 16 of the mold member 14, then moving the mold member 14 generally transversely to the direction of insertion of the assembly pin ends 48 to effect alignment of the assembly pin ends with the exposed portions 38 of the sleeves 34, and then inserting the assembly pin ends 48 into the exposed portions 38 of the sleeves 34.

Various of the features of the invention are set forth in the following claims.

I claim:

1. A mold assembly comprising a mold apparatus including a mold member having a first side which is contoured to impart a shape to a component, a second side opposite said first side, an aperture extending between said first and second sides, an ejector pin positioned proximate said second side of said mold member and having a first end movable into sliding engagement within said aperture to become a portion of a surface including said first side, said ejector pin also being movable to effect movement of the component away from said mold member after the component is imparted with the shape, and means engaging said second side of said mold member adjacent said aperture and projecting outwardly from said second side for reducing destructive contact of said first end of said ejector pin with said second side of said mold member when said first end moves into said aperture.

2. A mold assembly in accordance with claim 1 wherein said means for reducing destructive contact comprises a sleeve having a first portion positioned to slide onto said first end of said ejector pin having a second portion engaging said second side of said mold cavity and protruding from said first end of said ejector pin to receive therein an assembly pin having an end positioned to pass through said aperture from said first side of said mold member and into said sleeve so that said ejector pin can be guided into said aperture by said sleeve and the assembly pin.

3. A mold assembly in accordance with claim 2 wherein said second side of said mold member is chamfered at said aperture and wherein said second portion of said sleeve is tapered for engagement with the chamfer to facilitate alignment of said sleeve with said aperture.

4. A mold assembly in accordance with claim 1 wherein said ejector pin has a second end opposite said first end, wherein said mold assembly further includes an ejector plate extending generally transversely to said ejector pin, wherein said ejector plate is fixed to said second end of said ejector pin, and wherein said ejector plate is positioned to move said ejector pin in a first direction toward the component to eject the component after the component is imparted with the shape and to then move said ejector pin in a second direction opposite said first direction so that, after the component is ejected, said first end again becomes a portion of the surface including said first side.

5. A mold apparatus comprising a mold member having a first side which is contoured to impart a shape to a component, a second side, an aperture extending between said first and second sides, an ejector pin positioned adjacent said second side, and having an end positioned to move into said aperture to become a portion of a surface including said first side when the mold assembly is assembled, and positioned to effect movement of the component away from the mod member after the component is imparted with the shape, an assembly pin having an end positioned to pass through said aperture, and a sleeve located in alignment with said aperture in said mold member, having a first portion positioned to slide onto the end of said ejector pin for support of said sleeve on said end of said ejector pin, and having a second portion protruding from said end of said ejector pin to receive therein said end of said assembly pin in axial alignment with said ejector pin in said sleeve and with said aperture in said mold member.

6. A device in accordance with claim 5 wherein said end of said assembly pin is tapered to facilitate insertion of said end into the aperture and into said sleeve.

7. A device in accordance with claim 5 wherein said sleeve has a generally cylindrical interior surface.

8. A device in accordance with claim 5 wherein said sleeve has an axially extending slit.

9. A device in accordance with claim 5 wherein the second side of the mold member is chamfered at the aperture and wherein said second portion of said sleeve is tapered for engagement with the chamfer to facilitate alignment of said sleeve with the aperture.

10. A mold assembly comprising a mold apparatus including a mold member having a first side which is contoured to impart a shape to a component, a second side opposite said first side, an aperture extending between said first and second sides, an ejector pin positioned proximate said second side of said mold member and having a first end movable into sliding engagement within said aperture to become a portion of a surface including said first side, said ejector pin also being movable to effect movement of the component away from said mold member after the component is imparted with the shape, and means engaging said second side of said mold member adjacent said aperture and projecting outwardly from said second side for reducing destructive contact of said first end of said ejector pin at any time when said first end enters said aperture during assembly of said mold assembly.

11. A mold assembly in accordance with claim 10 wherein said means for reducing destructive contact comprises a sleeve having a first portion positioned to slide onto said first end of said ejector pin and having a second portion protruding from said first end of said ejector pin to receive therein an assembly pin having an end positioned to pass through said aperture from said first side of said mold member and into said sleeve so that said ejector pin can be guided into said aperture by said sleeve and the assembly pin.

12. A mold assembly in accordance with claim 11 wherein said second side of said mold member is chamfered at said aperture and wherein said second portion of said sleeve is tapered for engagement with the chamfer to facilitate alignment of said sleeve with said aperture.

13. A mold assembly in accordance with claim 10 wherein said ejector pin has a second end opposite said first end, wherein said mold assembly further includes an ejector plate extending generally transversely to said ejector pin, wherein said ejector plate is fixed to said second end of said ejector pin, and wherein said ejector plate is positioned to move said ejector pin in a first direction toward the component to eject the component after the component is imparted with the shape and to then move said ejector pin in a second direction opposite said first direction so that, after the component is ejected, said first end again becomes a portion of the surface including said first side.

14. A method of assembling a mold apparatus including a mold member having a first side which is contoured to impart a shape to a component, a second side opposite said first side, a plurality of apertures extending between the first and second sides, a like plurality of ejector pins generally positioned adjacent the second side and having respective ends positioned to respectively move into the apertures and to become a portion of a surface including the first side, and also positioned to effect movement of the component away from the mold member, said method comprising the steps of providing a like plurality of assembly pins having respective ends positioned to respectively pass through the apertures, and providing a like plurality of sleeves respectively positioned to slide partially onto the ends of the ejector pins and to effect self support thereof on the respective ends of the ejector pins and with respective portions of the sleeves exposed to receive therein the respective ends of the assembly pins in axial alignment with the respective ejector pins in the sleeves, partially and respectively sliding the sleeves onto the ends of the ejector pins, positioning the second side of the mold member proximate to the sleeves, respectively inserting the assembly pin ends through the apertures from the first side of the mold member and into the exposed portions of the sleeves, and moving the mold member relative to the ejector pins so that the ejector pins move into the apertures.

15. A method in accordance with claim 14 wherein said step of inserting said assembly pin ends through the apertures from the first side of the mold member and into the exposed portions of said sleeves comprises the steps of inserting one of the assembly pin ends through one of the apertures from the first side of the mold member, moving the mold member generally transversely to the direction of insertion of the assembly pin ends to effect alignment of the assembly pin ends with the exposed portions of the sleeves, and inserting the assembly pin ends into the exposed portions of the sleeves.

* * * * *